US006982730B2

(12) United States Patent
Han

(10) Patent No.: US 6,982,730 B2
(45) Date of Patent: Jan. 3, 2006

(54) APPARATUS AND METHOD FOR CORRECTING KEYSTONE DISTORTION

(75) Inventor: Dong Il Han, Seoul (KR)

(73) Assignee: LG Electronics Inc., Seoul (KR)

(*) Notice: Subject to any disclaimer, the term of this patent is extended or adjusted under 35 U.S.C. 154(b) by 301 days.

(21) Appl. No.: 09/882,520

(22) Filed: Jun. 15, 2001

(65) Prior Publication Data

US 2001/0055030 A1 Dec. 27, 2001

(30) Foreign Application Priority Data

Jun. 22, 2000 (KR) ............................. 2000-34558

(51) Int. Cl.
*G09G 5/00* (2006.01)

(52) U.S. Cl. ...................... 345/660; 345/667; 345/668; 345/560

(58) Field of Classification Search ........ 345/667–671, 345/660, 66 P, 530, 560
See application file for complete search history.

(56) References Cited

U.S. PATENT DOCUMENTS

| | | | | |
|---|---|---|---|---|
| 4,667,236 | A * | 5/1987 | Dresdner | 348/583 |
| 5,818,416 | A * | 10/1998 | Hwang | 345/667 |
| 5,831,592 | A * | 11/1998 | Cahill, III | 345/667 |
| 5,909,205 | A * | 6/1999 | Furuhashi et al. | 345/98 |
| 6,339,434 | B1 * | 1/2002 | West et al. | 345/667 |
| 6,411,267 | B1 * | 6/2002 | Narui | 345/10 |

* cited by examiner

*Primary Examiner*—Matthew C. Bella
*Assistant Examiner*—Po-Wei (Dennis) Chen
(74) *Attorney, Agent, or Firm*—Lee, Hong, Degerman, Kang & Schmadeka

(57) ABSTRACT

An apparatus and a method for correcting keystone distortions in a display system are disclosed. A horizontal size generator first receives N horizontal sync signals of an input image and generates N corresponding horizontal output sizes. Each of the output sizes is generated at each sync signal based on a horizontal input size, a vertical size, and a desired keystone factor or each of horizontal keystone offsets of the input image. A format converter then receives said input image and generates an output image. Each line of the output image now has the corresponding horizontal output size.

14 Claims, 5 Drawing Sheets

APPARATUS AND METHOD FOR CORRECTING KEYSTONE DISTORTION

BACKGROUND OF THE INVENTION

1. Field of the Invention

The present invention relates to a display system having a keystone distortion, and more particularly, to an apparatus and a method for correcting keystone distortions of a display system using format conversion.

2. Background of the Related Art

In general, big screen projection televisions, plasma display panel (PDP) televisions, and projectors are in great demand as display devices for digital televisions of these days due to the fact that high quality displays are now available. On the other hand, the demand for formerly used color picture tubes (CPT) having a direct view structure is currently being reduced. Particularly, the projectors have an advantage that they can provide amazingly large display screens compared to other display devices. For that reason, the extent of their uses is sharply increasing: the projectors are frequently being used even in personal digital televisions in addition to their former uses as display devices for business or seminar presentations.

The projectors require keystone correction that may not be required for other display devices. In a typical display device other than the projectors, a scanning unit and a screen unit are located inside of the display device, so frequent keystone corrections are not necessary. However, the keystone correction functions of the projectors are critically essential since the screen is separately located far away from the scanning unit.

When a projector is located above the centerline of the screen, it requires that the projector be aimed down at the screen and produces a keystone distortion causing the image at the bottom of the screen to be wider than at the top. Similarly, the image at the top of the screen will be wider than at the bottom if the projector is located under the centerline of the screen. Accordingly, the projector must initially generate the image having a keystone figure before projecting to the screen in order to have the display on the screen without any keystone distortion. Additionally, it is desired to be able to adaptively correct the distortion when the amount of the distortion varies. Projection televisions do not require various keystone corrections as much as the projectors do, but some correction is necessary as the thickness of a projection television is reduced.

In accordance with the prior art, the keystone correction usually involves in various controls of an optical device such as a lens system. Since it mechanically controls movements of the lens system, it results in increasing the cost of the projectors. It also requires frequent calibrations for an accuracy due to optical errors resulted from frequent keystone corrections. Change of the amount of keystone distortion due to mechanical vibrations or dilapidated parts of the projectors causes another problem to be generated. For offsetting such changes, the amount of the correction also must be controlled in order to have the optimal display quality.

SUMMARY OF THE INVENTION

Accordingly, the present invention is directed to an apparatus and a method for correcting keystone distortions that substantially obviates one or more problems due to limitations and disadvantages of the related art.

An object of the present invention is to provide an apparatus and a method for correcting keystone distortions by format conversions in an image-processing step without modifying the optical (lens) system in a display system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for correcting keystone distortions in a display system first includes a horizontal size generator that receives N horizontal sync signals of an input image and generates N corresponding horizontal output sizes, where N represents a total number of lines of said output image. Each of said output sizes being generated at each of said sync signals based on a horizontal input size, a vertical size, and a desired keystone factor of said input image. It further includes a format converter that receives said input image and generates an output image, each line of said output image now having said corresponding horizontal output size.

In another aspect of the present invention, an apparatus for correcting keystone distortions in a display system includes a horizontal size generator that receives N horizontal sync signals of an input image and generates N corresponding horizontal output sizes, each of said output sizes being generated at each of said sync signals based on a horizontal input size and each of horizontal keystone offsets of said input image and a format converter that receives said input image and generates an output image, each line of said output image now having said corresponding horizontal output size, where N represents a total number of lines of said output image.

In another aspect of the present invention, a method for correcting keystone distortions in a display system includes receiving horizontal sync signals of an input image, generating corresponding horizontal output sizes, each of said output sizes being generated at each of sync signals based on a horizontal input size, a vertical size, and a desired keystone factor of said input image, and receiving said input image and generating an output image by a format converter, each line of said output image now having said corresponding horizontal output size.

In another aspect of the present invention, a method for correcting keystone distortions in a display system includes receiving horizontal sync signals of an input image, generating corresponding horizontal output sizes, each of said horizontal output sizes being generated at each of sync signals based on a horizontal input size and each of horizontal keystone offsets of an input image, and receiving said input image and generating an output image by a format converter, each line of said output image now having said corresponding horizontal output size.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

According to the present invention, keystone distortions are corrected by using format conversions in the image-processing step rather than by mechanically modifying the optical path of the image. In other words, the format conversions are performed before displaying the image on a screen so that the keystone correction in the optical system is unnecessary. Consequently, size, weight, and cost of the display device can be greatly reduced.

Figure 1:
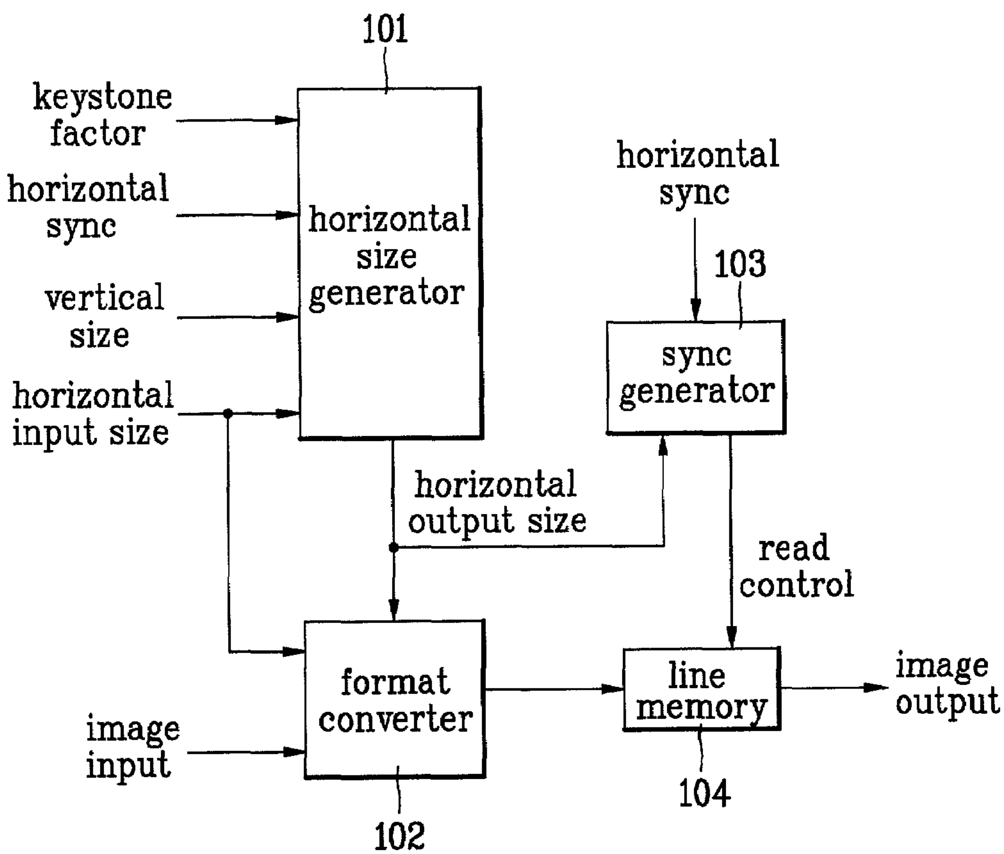
FIG. 1 illustrates a block diagram showing the structure of a keystone correction device according to the first embodiment of the present invention.
Figure 4:
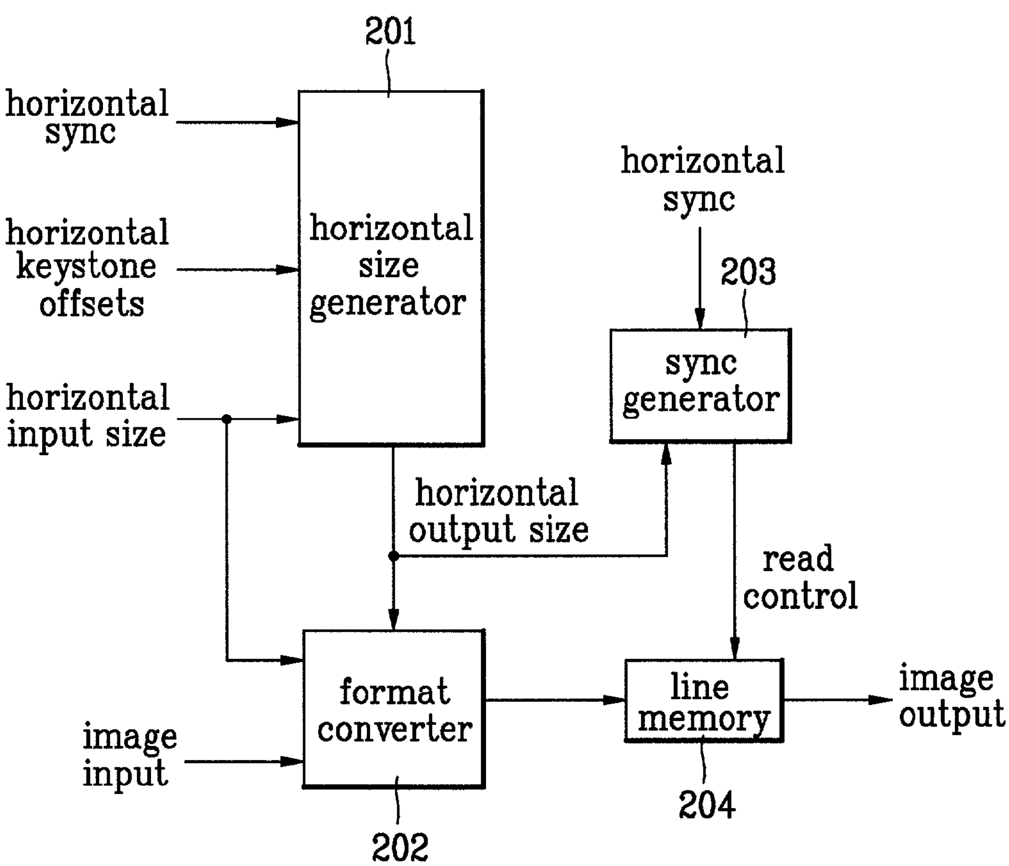
FIG. 4 illustrates a block diagram showing the structure of a keystone correction device according to the second embodiment of the present invention.
Figure 5:
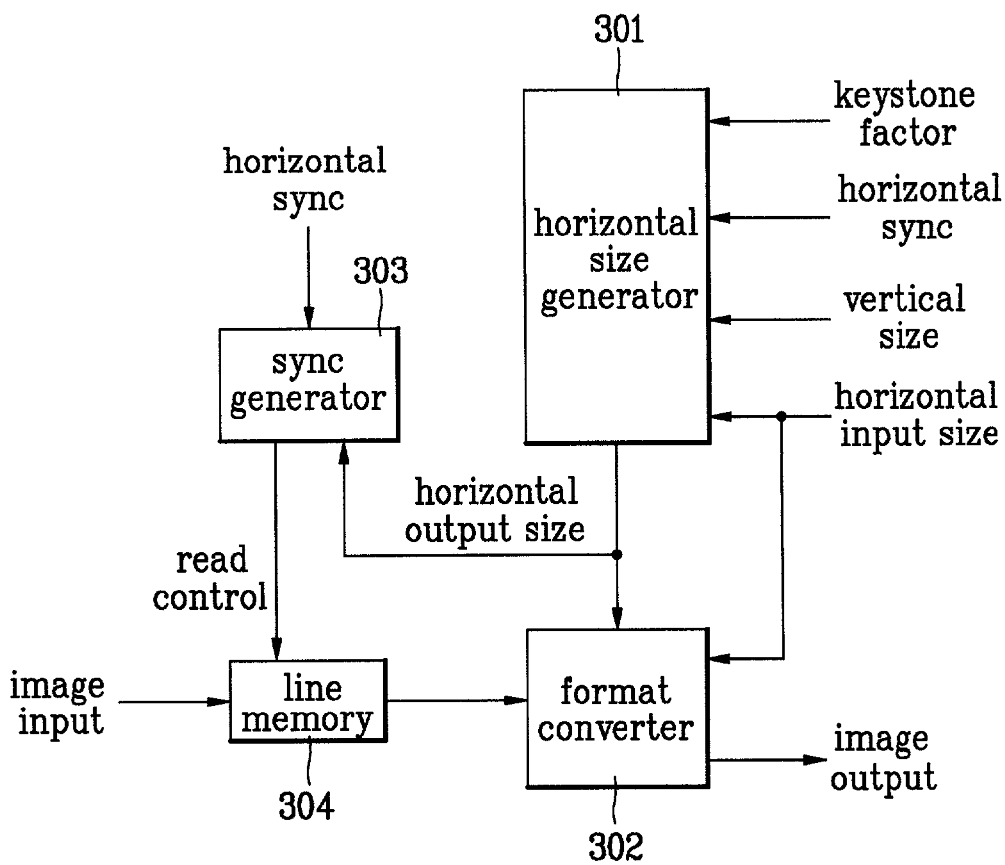
FIG. 5 illustrates a block diagram showing the structure of a keystone correction device according to the third embodiment of the present invention.

FIGS. 1, 4, and 5 illustrate the preferred embodiments of the keystones correction devices in accordance with the present invention. FIG. 1 illustrates a block diagram showing the structure of a keystone correction device according to the first embodiment of the present invention. The figure consists of a horizontal size generator (101), a format converter (102), a sync generator (103), and a line memory (104). The horizontal size generator initially receives a keystone factor, N horizontal sync signals of an input image, a vertical size, and a horizontal input size and generates N corresponding horizontal output sizes, each of the output sizes being generated at each of said sync signals based on the horizontal input size, the vertical size, and the desired keystone factor of the input image. The format converter (102) receives the horizontal input size, the horizontal output sizes generated from the size generator (101), and the input image and generates an output image, each line of the output image now having its corresponding horizontal output size. The sync signal generator (103) receives the horizontal sync signals and horizontal output sizes generated from the horizontal size generator (101) and generates read control signals. The line memory (104) then stores each line of the output image generated from the format converter (102) and outputs the stored line of said output image according to the read control signals.

Figure 2:
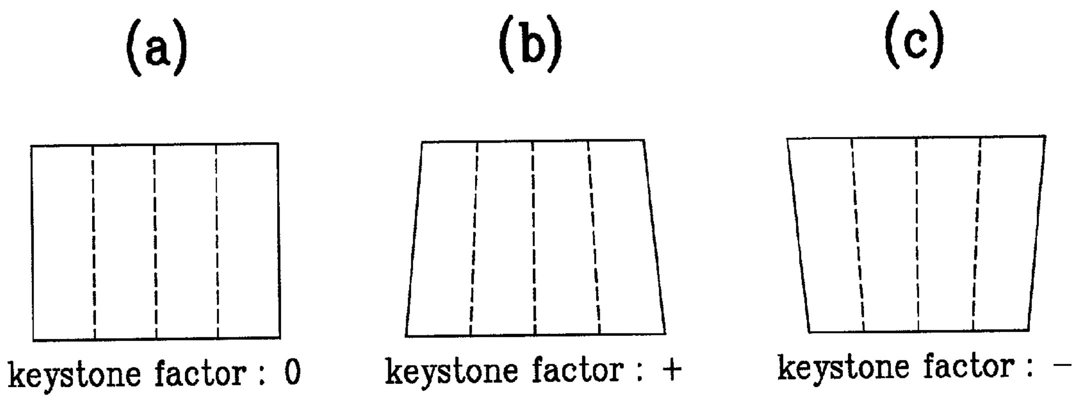
FIG. 2 illustrates examples of different keystone factors.

FIG. 2 illustrates several examples of keystone factors. When there is no keystone distortion involved in displaying an image, the format converter (102) can output the input image as received without any format change made. However, when a display device such as a projector is located under the centerline of the screen, it requires that the device be aimed up at the screen and produces a keystone distortion causing the image at the top of the screen to be wider than at the bottom (see FIG. 2(*c*)). Therefore, if the output image has a format shown as FIG. 2(*b*) before it is displayed on the screen, then the keystone distortion can be offset. For example, the output image can have a format that the ith horizontal output size is larger than its previous ((i−1)th) horizontal output size, and the first or Nth horizontal output size is equal to the horizontal input size, where i=2,3,4, . . . , N.

On the other hand, when the display device is located above the centerline of the screen, it is desired that the output image has a format shown in FIG. 2(*c*). In order to achieve this, the ith horizontal output size is less than the previous ((i−1)th) horizontal output size, and the first or Nth horizontal output size is equal to the horizontal input size, where i=2,3,4, . . . , N.

FIGS. 2(*a*), (*b*), and (*c*) are normal, upward, and downward display formats having their keystone factors 0, +, and −, respectively. In order to output the image in the upward or downward display format, the horizontal size generator (101) must receive a keystone factor and output a corresponding horizontal output size of each line of the image to the format converter (102) at each horizontal sync signal. The keystone factor can be given from a user or a control device.

The horizontal size generator receives a vertical size, a horizontal input size, horizontal synchronizing signals, and a keystone factor and generates a horizontal output size corresponding to each line of the image to the format converter before each horizontal synchronizing signal becomes active. The format converter (102) then receives the horizontal input size and the horizontal output size and performs a format conversion. If the output size is larger than the input size, the conversion results in augmenting the image size. On the other hand, if the output size is less than the input size, it results in reducing the image size. The augmentation/reduction ratio is determined by the horizontal input and output sizes.

The sync signal generator (103) receives the horizontal sync signals and the horizontal output sizes and generates new horizontal sync signals (read control signals) to the line memory (104).

Thereafter, the line memory (104) stores each line of the output image generated from the format converter (102), and outputs the image data in accordance with the read control signals received from the sync signal generator (103). In other words, the horizontal sync signals generated are used as read control signals in the line memory (104). It is not necessary to delay generating the output after receiving the input for a time interval of one line of image. If keystone factors between the top and bottom of the image have a 20% difference, then generating the output can be delayed for 20% of said time interval after receiving the input. The line memory (104) may be replaced with other memory such as a field or frame memory.

Figure 3:
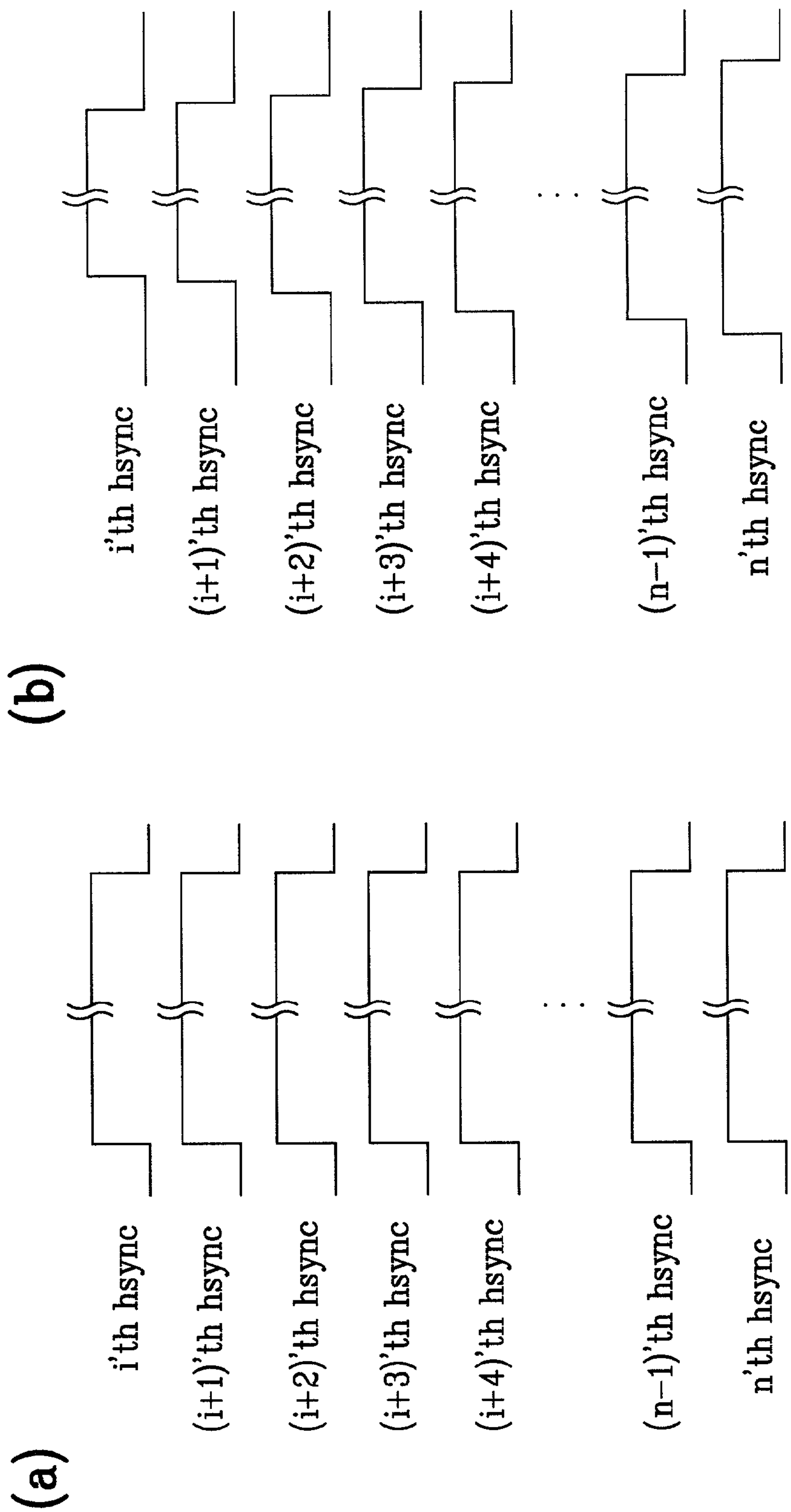
FIG. 3 illustrate examples of horizontal sync signals generated from a sync signal generator.

FIGS. 3(*a*) and (*b*) illustrate examples of horizontal sync signals generated from the sync signal generator (103). As it can be shown in both figures, an image generated from the signals shown in FIG. 3(*a*) will be similar to FIG. 2(*a*) since all the signals have a same horizontal size. The length of the nth horizontal synchronizing signal of FIG. 3(*b*) is same as that of the nth signal in FIG. 3(*a*).

Generally, when the size of an output image is less than the size of an input image, the output image is generated separately depending on the format conversion rate even if the input image is in a series. It means that the converted output image data are not in a series as input data when the size is reduced. In this case, the output data are initially stored and are displayed later. The format converter in FIG. 1 generates the output right after input data are received, or it reduces the size of the input image, stores the reduced image in a line memory (104), and outputs the stored image in a consecutive order. A line memory is required in order to produce continuous output of fragmentary data. Therefore, the line memory (104) generates the continuous output when a predetermined time period is lapsed after storing the fragmentarily received data. For this reason, the line memory (104) is placed after the format converter.

The FIG. 4 illustrates another embodiment of the present invention that includes a horizontal size generator (201) that receives a horizontal synchronizing signal, a horizontal input size, and horizontal keystone offsets. The keystone factor used in the horizontal size generator (101) in FIG. 1 is for a frame of an image. However, each of the horizontal keystone offsets used in FIG. 4 corresponds each line of the input image. The horizontal size generator (101) in the first embodiment requires a more complicate hardware, but it is easier to control the data for the user. However, when all the keystone offsets for each horizontal synchronizing signal are inputted to the horizontal size generator (201), each corresponding horizontal output size can be obtained in a more simpler manner since the keystone offsets can be calculated by simple programming outside of the correction device, requiring a comparatively less complicated hardware.

The first and second embodiments of the present invention reduce the size of an input image. When reducing the size of the input image, the image quality may be degraded by aliasing. In order to avoid such aliasing, the keystone corrections should increase the horizontal size. This is illustrated in the FIG. 5, which is another embodiment of the present invention. When enlarging the size of an image, a format converter (302) must receive the input when it requires so that an output image can be generated in a series. Therefore, after the input image is stored in a line memory (304), a format converter (302) should be able to generate the required output image data. For that reason, the line memory (304) is located before the format converter (302).

According to the present invention, the keystone distortions can be corrected by using format conversion in a display device for which the keystone correction must depend on its keystone factor. Therefore, the distortion can be corrected in a more simple and stable manner than the prior method in which an optical path was mechanically modified. Since there is no modification of a mechanical or optical path of any device, the cost of the device can be significantly reduced by using the present invention. Additionally, it is easier to re-correct the distortion when the displacement between the screen unit and the scanning unit changes. The keystone factor used for generating a corresponding output size is renewable, and once it is selected, its value permanently remains unchanged so that frequent calibrations, which are often used by the prior display devices, are not necessary.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for correcting keystone distortions in a display system comprising:

a horizontal size generator that receives N horizontal sync signals of an input image and generates N corresponding horizontal output sizes, each of said horizontal output sizes being generated at each of said sync signals based on a horizontal input size, a vertical size, and a desired keystone factor of said input image; and a format converter that receives said input image and generates and output image, by converting the received input image based on the horizontal input size so that each line of said output image has a horizontal output size corresponding to a successive one of the N horizontal output sizes generated by said horizontal size generator;

a sync signal generator that generates a read control signal based on said N horizontal sync signals and said horizontal output sizes; and a line memory that stores each line of said output image generated from said format converter and outputs said each stored line of said output image according to said read control signal, where N represents a total number of lines of said output image.

2. An apparatus for correcting keystone distortions in a display system comprising:

a horizontal size generator that receives N horizontal sync signals of an input image and generates N corresponding horizontal output sizes, each of said output sizes being generated at each of said sync signals based on a horizontal input size and each of N corresponding horizontal keystone offsets of said input image; and a format converter that receives said input image and generates an output image, by converting the received input image based on the horizontal input size so that each line of said output image has a horizontal output size corresponding to a successive one of the N horizontal output sizes generated by said horizontal size generator;

where N represents a total number of lines of said output image.

a sync signal generator that generates a read control signal based on said N horizontal sync signals and said horizontal output sizes; and a line memory that stores each line of said output image generated from said format converter and outputs said each stored line of said output image according to said read control signal.

where N represents a total number of lines of said output image.

3. A method for correcting keystone distortions in a display system comprising:

receiving N horizontal sync signals of an input image;

generating N corresponding horizontal output sizes, each of said output sizes being generated at each of said sync signals based on a horizontal input size, a vertical size, and a desired keystone factor of said input image; and receiving said input image at a format converter and generating an output image by a each line of said output image has a horizontal output size corresponding to a successive one of the N horizontal output sizes generated by said horizontal output size generation;

generating a read control signals based on said N horizontal sync signals and said horizontal output sizes; and storing each line of said output image generated from said format converter and outputting said each stored line of said output image according to said read control signal.

4. The apparatus of claim 3, wherein the ith horizontal output size is larger than the (i−1)th horizontal output size, and the Nth horizontal output size is equal to said horizontal input size, where i=2,3,4, . . . N.

5. The apparatus of claim 3, wherein the ith horizontal output is larger than the (i−1)th horizontal output size, and the first horizontal output size is equal to said horizontal input size, where i=2,3,4, . . . N.

6. The apparatus of claim 3, wherein the ith horizontal output size is larger than the (i−1)th horizontal output size, and the Nth horizontal output size is equal to said horizontal input size, where i=2,3,4, . . . N.

7. The apparatus of claim 3, wherein the ith horizontal output size is smaller than the (i=1)th horizontal output size, and the first horizontal output size is equal to said horizontal input size, where i=2,3,4, . . . N.

8. A method for correcting keystone distortions in a display system comprising:

receiving N horizontal sync of an input image;

generating N corresponds horizontal output sizes, each of said horizontal output sizes being generated at each of said sync signals based on a horizontal input size and each of N corresponding horizontal keystone offsets of said input image; and receiving said input image at a format converter and generating an output image by converting the received input image based on the horizontal input size so that each line of said output image has a horizontal output size corresponding to a successive one of the N horizontal output sizes generated by said horizontal output size generation;

generating read control signal based on said N horizontal sync signals and said horizontal output sizes; and storing each line of said output image generated from said format converter and outputting said stored line of said each output image according to said read control signal, where N represents a total number of lines of said output image.

9. The apparatus of claim 8, wherein the ith horizontal output size is larger than the (i−1)th horizontal output size, and the Nth output size is equal to said horizontal input size, where i=2,3,4, . . . N.

10. The apparatus of claim 8, wherein the ith horizontal output size is larger than the (i=1)th horizontal output size, and the first horizontal output size is equal to said horizontal input size, where i=2,3,4, . . . N.

11. The apparatus of claim 8, wherein the ith horizontal output size is smaller than the (i−1)th horizontal output size, and the Nth horizontal output size is equal to said horizontal input size, where i=2,3,4, . . . N.

12. The apparatus of claim 8, wherein the ith horizontal output size is smaller than the (i=1)th horizontal output size, and the first horizontal output size is equal to said horizontal input size, where i=2,3,4, . . . N.

13. An apparatus for correcting keystone distortions in a display system comprising:

a horizontal size generator that receives N horizontal sync signals of an input system and generates N corresponding horizontal output sizes each of said horizontal output sizes being generated at each of said sync signals based on a horizontal input size and each of N corresponding horizontal keystone offsets of said input image;

a format converter that receives said input image and generates an output image, by converting the received input image based on the horizontal input size so that each line of said output image has a horizontal output size corresponding to a successive one of the N horizontal output sizes generated by said horizontal size generator;

a sync signal generator that generates a read control signal based on said N horizontal sync signals and said horizontal output sizes; and a line memory that stores each line of said input image and outputs said each stored line of said output image to said format converter according to said read control signal, wherein N represents a total number of lines of said output image.

14. A method for correcting keystone distortions in a display system comprising:

receiving N horizontal sync signals of an input image;

generating N corresponding horizontal output sizes, each of said horizontal output sizes being generated at each of said sync signals based on a horizontal input size and each of N corresponding horizontal keystone offsets of said input image;

receiving said input image at a format converter and generating an output image by converting the received input image based on the horizontal input size so that each line of said output image has a horizontal output size corresponding to a successive one of the N horizontal output sizes generated by said horizontal output size generation;

generating a read control signal based on a said N horizontal sync signal and said horizontal output sizes; and storing each line of said input image and outputting said each store line of said output image to said format converter according to said read control signal, wherein N represents a total number of lines of said output image.

* * * * *